United States Patent [19]

Lacy

[11] Patent Number: 4,959,115

[45] Date of Patent: Sep. 25, 1990

[54] METHOD OF PRODUCING BLOCKS OF SELF-ADHESIVE LABELS OR THE LIKE AND OF APPLYING THE LABELS TO A BODY

[76] Inventor: Robert M. Lacy, 76 The Wynding, Bedlington, Northumberland, England, NE22 6HW

[21] Appl. No.: 287,499

[22] Filed: Dec. 21, 1988

[30] Foreign Application Priority Data

Dec. 23, 1987 [GB] United Kingdom ................ 8729929

[51] Int. Cl.[5] ............................................ B32B 31/18

[52] U.S. Cl. .................................... 156/264; 156/267; 156/269; 156/289; 428/40; 428/41; 428/42; 428/43

[58] Field of Search ............... 156/261, 264, 267, 269, 156/289; 428/40, 41, 42, 43, 101; 282/9 R, 23 R; 281/2

[56] References Cited

U.S. PATENT DOCUMENTS

| | | | |
|---|---|---|---|
| H 377 | 12/1987 | Greig | 428/42 |
| 2,248,318 | 7/1941 | Van Cleef | 156/264 |
| 4,743,319 | 5/1988 | Ramcke | 156/264 |
| 4,837,062 | 6/1989 | Dunshee et al. | 428/41 |

*Primary Examiner*—Caleb Weston
*Attorney, Agent, or Firm*—Rodman & Rodman

[57] ABSTRACT

A method of producing blocks of self-adhesive labels or the like involves feeding continuously to a cutting device a continuous label stock which on one face has a number of repeated images overlaid by a release coating and on the other face has a pressure-sensitive adhesive coating. In the cutting device a succession of sheets, each having more than one image, is cut from the stock and the sheets are formed into a stack of superimposed cut sheets, either simultaneously with the cutting or in a subsequent step. Finally, a number of blocks of superimposed labels or the like, each having a single image, are cut from the stack of sheets. Various methods of applying the labels from the blocks to cylindrical or non-cylindrical bodies are given.

18 Claims, 6 Drawing Sheets

METHOD OF PRODUCING BLOCKS OF SELF-ADHESIVE LABELS OR THE LIKE AND OF APPLYING THE LABELS TO A BODY

The present invention is a method of producing blocks of self-adhesive labels or the like. It also includes a method of applying labels from such a block to bodies of different shapes.

Self-adhesive labels are widely available in the form of individual labels or as continuous rolls of labels and they have usually been provided adhered to a liner of backing material which is coated to facilitate removal of the label when it is to be used. The separating of label and liner is sometimes a difficult exercise and furthermore the use of a backing material for this purpose is inherently wasteful since it is discarded after separation. In addition, the presence of a liner affects the handling or treatment of the label proper, for example during printing of the label.

For these reasons among others, it has been suggested to provide blocks of superimposed self-adhesive labels wherein the backing material is omitted and the front face of each label is coated with a release coating to facilitate separation of successive labels from the block for use. Such blocks or pads of labels are described in Patent Specification GB 2156705 and in European patent specification No. 0244265.

Blocks of superimposed self-adhesive labels of the foregoing kind are cut directly from a continuous label stock by means of a hollow die. A separate hollow die is used for each block to be cut. Thus the production capacity of a given cutting station, and in turn of a production line including that cutting station, is limited by the number of hollow dies available. Since the cost of producing label blocks by this method is governed both by the cost of the equipment and by the rate at which the blocks are produced, the number of hollow dies employed is a significant influence on the production cost.

It is an object of the present invention to provide a method of producing blocks of self-adhesive labels or the like, which method is an improvement of the prior method proposed for this purpose and makes possible the production of such blocks at an increased production rate.

Blocks of such self-adhesive labels without backing liners are very convenient to use when applied by hand but are not always readily applied by machine to containers or other bodies of different shapes. For example, the detaching of a single label from such a block sometimes fails if the container is not properly presented to the block (or vice versa) or more than one label may become detached. It is therefore a further object of the present invention to provide a method of applying to bodies of different shapes labels produced by the production method according to the invention.

The method according to the present invention for producing blocks of self-adhesive labels or the like comprises feeding continuously to a cutting device a continuous label stock having a multiplicity of repeated images on a first face thereof overlaid by a release coating and further having a pressure-sensitive adhesive coating on the second face thereof, cutting from the continuous label stock a succession of cut sheets each having a plurality of said images thereon, forming a stack of superimposed said cut sheets, and subsequently cutting from a said stack a plurality of blocks of superimposed labels or the like, each said label or the like having a single said image thereon.

While, in the foregoing discussion, the invention has been described in the context of the production of labels, the present invention is equally applicable to the production of blocks of self-adhesive products similar to labels. For example, rectangular or other shaped objects may be used for wall decoration in the manner of wallpaper strips or tiles and may be produced in blocks by the process according to the invention. Interlocking cut shapes, for examples hexagons or triangles, may be used to provide a continuous decorative design. By way of further example, strips of self-adhesive decorative tape such as are commonly used for packaging purposes and conventionally dispensed from a roll may be produced in block form by the present process. To avoid undue repetition, the description of the present invention hereinafter will be confined to its application to the production of labels. However, it will be readily recognised that such related diverse products as are referred to above may be produced by the same process.

The images upon the first face of the continuous label stock may be formed by printing or by photographic reproduction. A multiplicity of repeated such images are applied, with the aim that each of the said images shall form or appear upon a single label. Photographic imaging is a known means of providing very high quality, full colour images very economically for users who require a relatively small number of labels. However this technique is rarely used with conventional self-adhesive labels because of the very high cost of converting the photographic web into a self-adhesive laminate. In the case of the present invention, the use of photographic imaging is more readily acceptable.

The continuous label stock may be of paper but non-paper substrates, for example substrates of synthetic polymeric sheet materials, are also suitable.

The images on the first face of the continuous label stock are overlaid by a release coating to reduce the adhesion between adjacent superimposed labels and permit their separation without harm to the labels or to the images thereon. Such release coatings are well known and are readily available.

The second face of the continuous label stock carries a coating of a pressure-sensitive adhesive. Again, such adhesives for coating labels are well known and are readily available from a range of suppliers.

The continuous label stock is fed continuously to a cutting device and is there cut to form a succession of cut sheets, each of which has a plurality of the repeated images on it. The images upon the cut sheets may be repeated in the direction of the length of the stock and/or in a direction across the length of the stock, or in an intermediate direction. A stack of superimposed cut sheets is formed, either simultaneously with the cutting of the sheets from the stock or in a subsequent operation.

Thus, for example, particularly with the achievement of high-speed production in mind, the continuous label stock may be fed to a rotary die, by means of which an incomplete cutting is effected whereby each intended sheet is cut along a major proportion of its circumference but is left joined to the continuous web at a small number of positions around its circumference. In this way, the intended sheets are readily conveyed to a station whereat the sheets are separated from the web to form a superimposed stack of sheets. This subsequent separating and stacking of the sheets may readily and advantageously be carried out by means of a shear cutting device. By oscillating the movement of the shear cutting device, or oscillating that of feed-in and feed-out rollers associated with the device, it is possible to maintain the continuous label stock in continuous forward movement, so that high production speeds can be achieved.

As an alternative, the cutting and stacking of the sheets may be carried out simultaneously in a single operation. For this purpose, the continuous label stock may be fed continuously to a die set comprising cooperating male and female dies. As each sheet is cut from the continuous web it is superimposed upon previously cut sheets within the hollow female die and forms a stack which may be withdrawn from the rear of the die. Preferably, the surface surrounding the cutting area of the female die is modified to render it non-sticking, for example by roughening that surface or by applying to it a non-stick coating such as of polytetrafluoroethylene. In addition, it is preferred to dispose an apertured panel between the continuous stock and the male die such that, when the male die is withdrawn through the aperture after each cutting stroke, adhesion of the web to the die is prevented.

It is also generally advantageous to arrange that the adhesive coating is absent from the web in the region of the periphery of the intended cut sheets. In this way, the adhesive cannot impede the cutting operation. Since the peripheral areas of the sheets may be discarded in the subsequent cutting of the label blocks from the sheet stack, adhesion of the labels in use is unaffected.

The final cutting of the blocks of superimposed self-adhesive labels from the stacks of cut sheets may be carried out manually or automatically or semi-automatically. For example, the stacks may be cut by means of a guillotine or a die cutter may be employed for this purpose.

The blocks of labels which are produced by the process of the present invention will normally be straight-sided vertical stacks. In order for each individual label to be dispensed from the block, particularly where the labels are to be applied mechanically to containers or the like, it is desirable that the labels be of relatively stiff material. However, according to one aspect of the invention, the blocks may be modified after production by displacing adjacent labels from vertical superimposition. This may then allow the labels to be applied more readily directly from the block, with the result that less stiff materials may be used. The displacing may, for example, be by an amount not exceeding 45 degrees from the vertical, preferably between 5 and 25 degrees. The displacing may readily be carried out mechanically, for example by securing one or more blocks of labels in a clamp and applying a shear force to the top surface of the clamp.

The present invention also includes a method of applying to a generally cylindrical body a label from a block of labels produced by the production method according to the invention, comprising mounting the block of labels with one edge of the end label in said block projecting, adhesive side forward, beyond a continuous guide rail into a space defined by said guide rail and a driven belt, and driving said belt to cause the body to rotate along the guide rail.

The invention further includes two alternative methods of applying to a non-cylindrical body a label from a block of labels produced by the production method according to the invention. The first such method comprises transferring the end label in the block to a grooved, non-stick roller and subsequently transferring the label from the roller to the non-cylindrical body. The alternative method comprises partially releasing the end label in the block by rotating two non-stick rollers outwardly over the adhesive surface of the label and subsequently bringing that surface into contact with the non-cylindrical body.

The invention will now be further described and illustrated with reference to the accompanying drawings, wherein.

Figure 3:
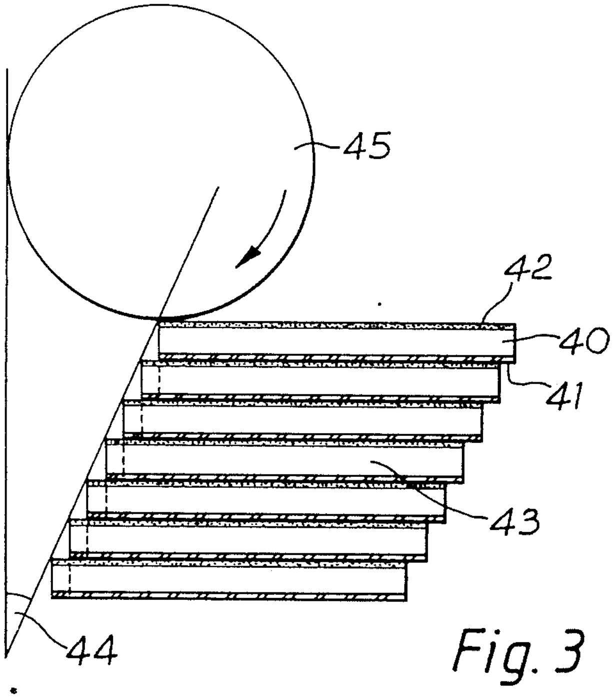
Figure 4:
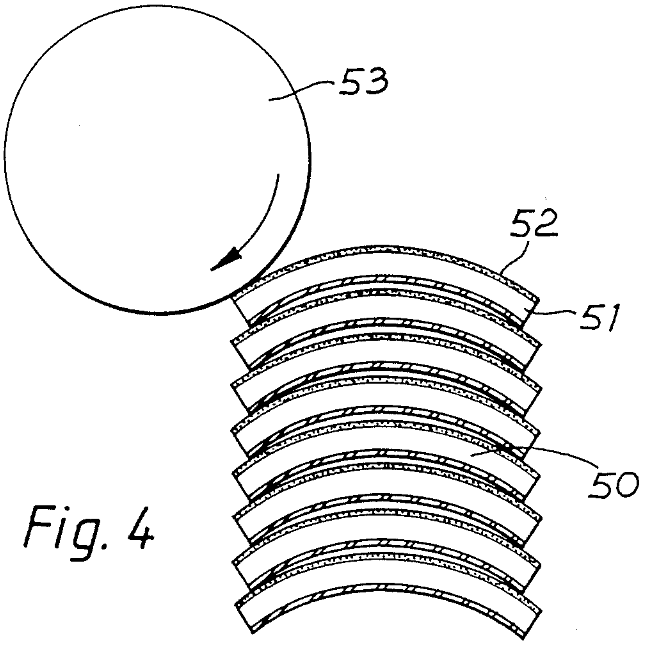
Figure 5:
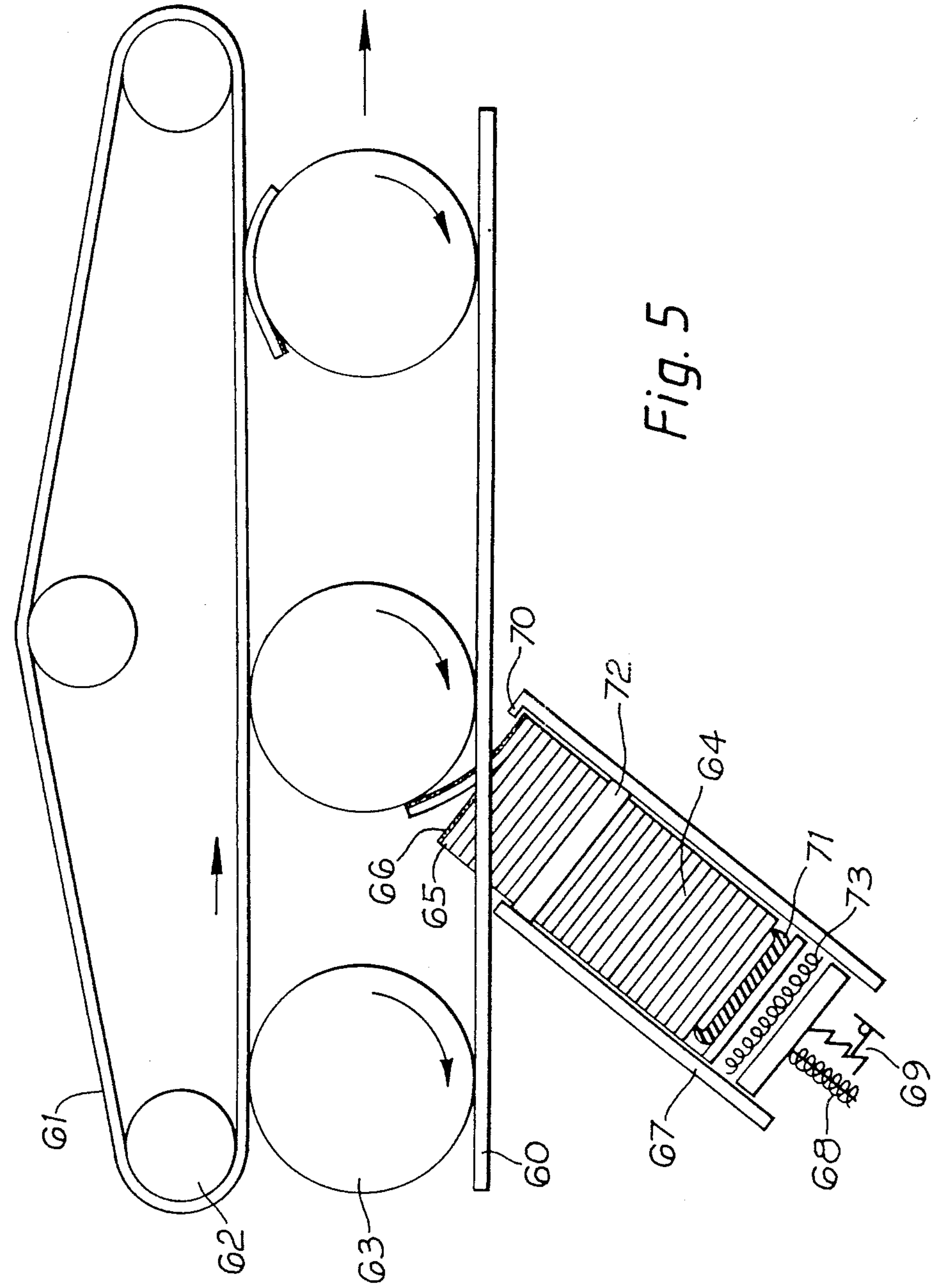
Figure 6:
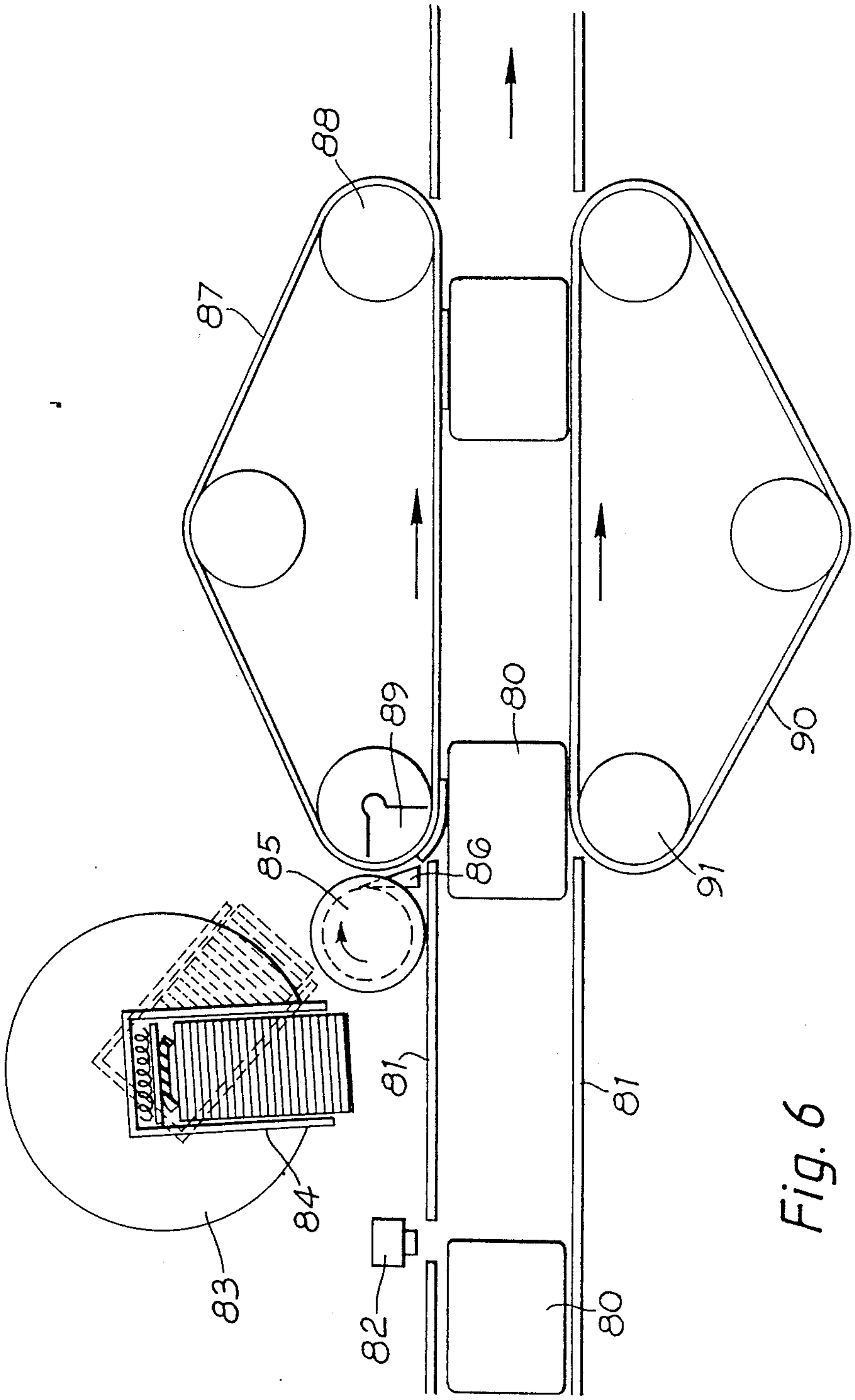
Figure 7:
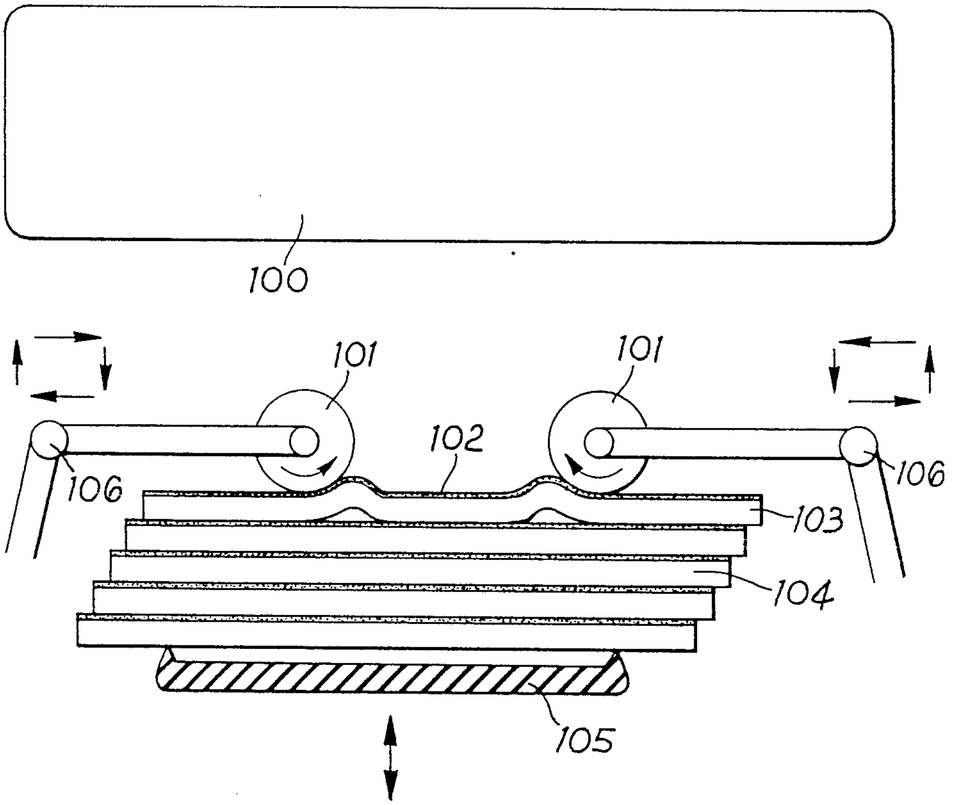

FIG. 3 and 4 respectively illustrate diagrammatically the advantage of modifying the label blocks produced by the method according to the invention;

FIG. 5 is diagrammatic representation of a method of applying labels from blocks produced by the method of the present invention to circular containers; and FIGS. 6 and 7 respectively are diagrammatic representations of two methods of applying labels from blocks produced by the method of the present invention to non-circular containers.

Figure 1:
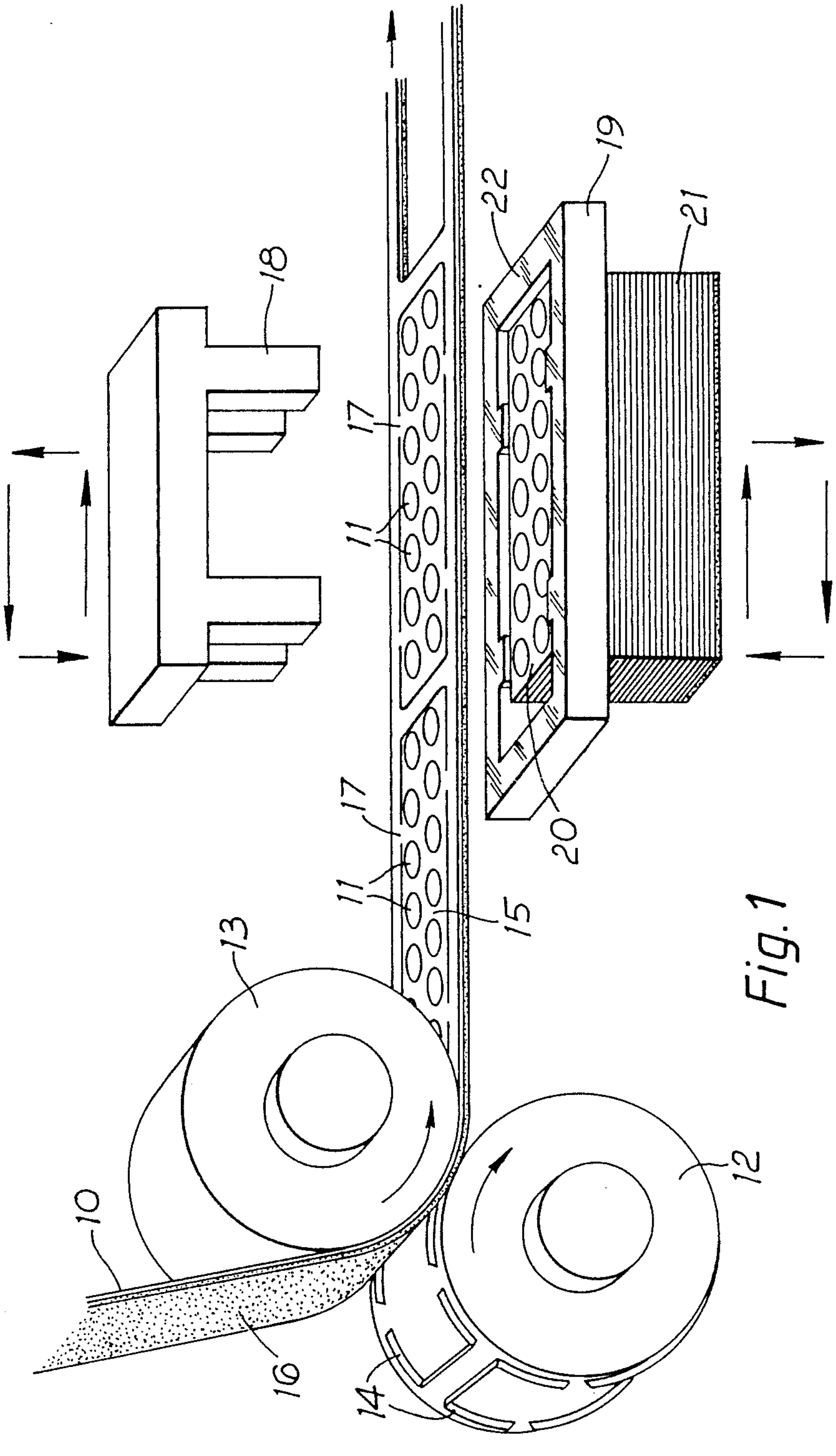
FIG. 1 is a diagrammatic representation of a first preferred method of forming a stack of superimposed sheets according to the present invention.

As illustrated in FIG. 1, a continuous label stock in the form of a web 10, which has been printed with a multiplicity of repeated images 11, is fed continuously at speed into the nip between an engraved cutting roller 12 and a backing roller 13. The cutting roller 12 has knife edges 14 on its surface and the rollers together cut the web in register with the images 11 to form incompletely-cut sheets 15 each bearing several of the images 11. The web 10 is so fed to the rollers 12, 13 that the adhesive surface 16 of the web contacts the knife edges 14 but not the surface of the roller 12. The cuts around the periphery of the sheets 15 are discontinuous so that small bridges 17 are left connecting the sheets 15 to the web, to enable the sheets 15 to be carried to the next station, which is a stacking device. The stacking device comprises two cooperating parts 18 and 19 which together shear-cut the bridges 17 and places each cut sheet 20 upon the previously-cut sheets to form a stack 21. If a continuous motion of the web 10 is required for high-speed operation then the stacking device is given an oscillating movement such that the stacking unit is moving in the same direction as the web, and at the same speed, during the pressing-out operation. Alternatively feed-in and feed-out rollers can be employed with an oscillating movement such that the continuously moving web is actually stationary between the top and bottom parts 18, 19 during the pressing-out operation.

The stack 21 of cut sheets 20 is removed from the underside of the stacking device part 19 and cut vertically to form a number of blocks of labels, each bearing one image 11.

The upper surface 22 of the part 19 of the stacking device may be coated with a non-stick material to prevent adhesion of the web 10 to that surface.

Figure 2:
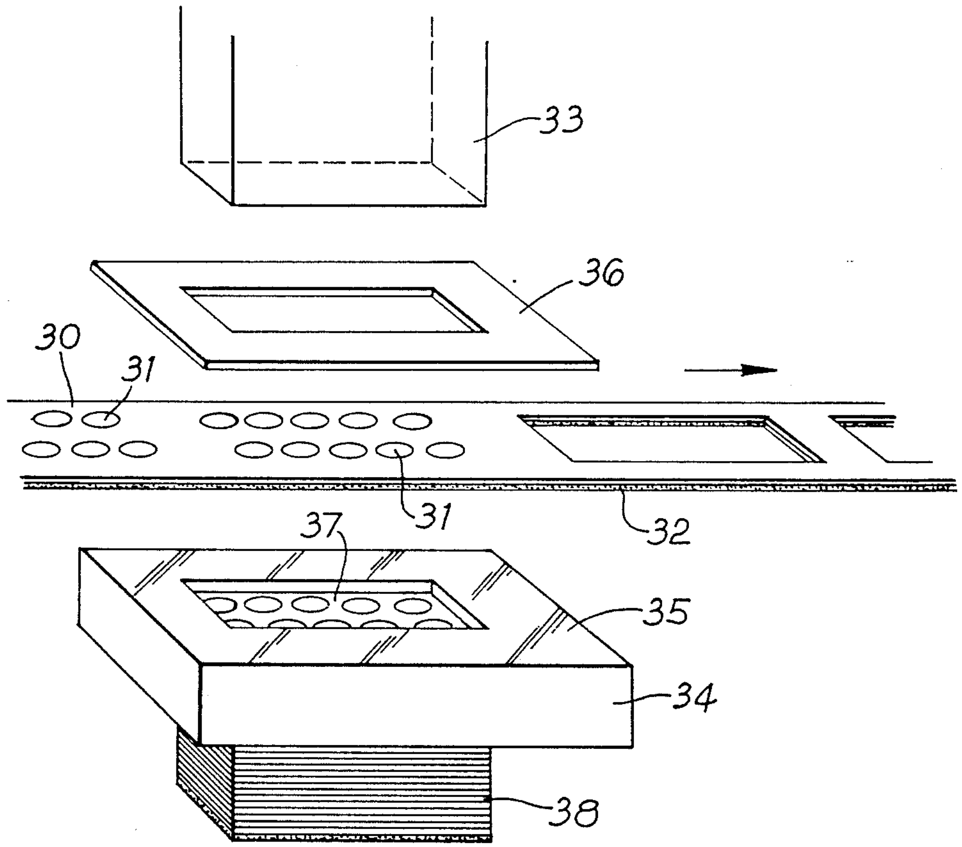
FIG. 2 is a diagrammatic representation of a second preferred method of forming a stack of superimposed sheets according to the invention.

Referring now to FIG. 2, the illustrated continuous web 30, carrying groups of repeated printed or photographic images 31 on its upper surface and overlaid on that surface with a release coating, has a coating 32 of pressure-sensitive adhesive on its lower surface. The web 30 is conveyed to and from a die set by feed-in and feed-out rollers (not shown) operated with an oscillating motion, so that the web, while fed continuously from its source, is intermittently stationary between the dies of the die set. An advantage of this form of cutter as contrasted with that of FIG. 1 is that the action of the die set is a shearing action and thus the cutting edges are not blunted, or the cutting base worn, by repeated mutual contact.

The die set comprises a male die 33 and a female die 34, the upper surface 35 of the latter being coated with a non-stick material to avoid the web adhering to the female die. Disposed between the web 30 and the male die 33 is an apertured plate 36, through which the male die passes during the cutting stroke. The function of the plate 36 is to assist disengagement of the web from the male die as the latter is withdrawn after cutting. After each cutting stroke, the web is advanced ready for the next stroke.

Sheets 37 are cut from the web 30 by the die set 33, 34 in register with the repeat pattern of the images 31, such that each sheet 37 carries a number of images (ten in the illustrated example). The cut sheets form a stack 38, which may be withdrawn from below the female die. Subsequent cutting of the stack 38 gives, in the illustrated case, ten blocks of labels, each carrying a single image 31.

FIG. 3 illustrates diagrammatically a block 43 of labels 40, each having a release coating 41 and an adhesive coating 42. The block 43 has been modified by displacing each label 40 a short lateral distance from the one below it. Thus the block is inclined by the angle identified by the numeral 44. As a result, when a container 45 is rolled across the uppermost label 40 in the block, the first label is more readily detached from the remaining labels in the block.

An alternative way in which a block 50 of labels 51 may advantageously be modified is illustrated diagrammatically in FIG. 4, wherein the labels 51 are each given a curve with the adhesive surface 52 on the convex face of the curved label. The curve can be introduced mechanically or by applying moisture to one side of the paper web. Again pick-up of the top label in the block by a rotating container 53 is assisted as a result of the modification of the block.

Referring now to FIG. 5, the illustrated apparatus includes a pair of parallel guide rails 60, parallel to which a continuous drive belt 61 is driven by a motor 62. By means of the belt 61, a succession of cylindrical containers 63 are caused to roll along the rails 60. Projecting upwardly at an angle between the rails 60 is a block 64 of labels 65, each with its adhesive side 66 uppermost. Rotation of each container 63 picks up the leading edge of the top label in the block and pulls the label from the block.

The block 64 is held in a magazine 67 and is fed forward by means of a simple spring 68 with non-return rachet 69, which is common on conventional label magazines. A small lug 70 prevents the label block 64 from being pushed completely out of the magazine by the spring-and-rachet mechanism. The lug 70 also positions the projection of the front label accurately into the path of containers 63. The vertical positioning of the block of labels relative to the containers is fixed by a suction cup 71 and a label template 72. A small cushion or spring 73 allows the block 64 to be displaced backwards slightly, to allow the passage of the container past the projection of the block. Alternatively, the drive belt 61 may allow displacement of the container over the projecting block.

Instead of the lug 70, an optical, pneumatic or electrical device may be used to sense the position of the front surface of the block 64, by monitoring the trailing edge of the foremost label, or the position of the rear of the block, or the displacement of the drive belt opposite the block.

When the label has been taken up by the container, it is duly smoothed down by the rotation of the container against the belt 61.

An advantage of applying the labels by rolling the containers along continuous guide rails with only the leading edge of the block of labels projecting into the path of the containers is that tapered containers can be accommodated, since the label has the ability to twist into the correct horizontal plane prior to contacting the container surface. The containers are also rotated with more stability when the guide rail is continuous.

FIG. 6 illustrates one way in which labels may be applied to non-circular containers. As shown, the containers 80 are transported into the applicator between guide rails 81. A container sensing device 82 instructs a turret 83 to oscillate the label magazine 84 past a rotating, grooved cylinder 85 which removes the top label from the block. The rotating groove cylinder is of a non-stick material such as polyethylene which preferentially will pull the label from the release surface of the adjacent label in the block but will allow the first label subsequently to be removed cleanly from the surface of the grooved cylinder by a non-stick comb 86 whose teeth interlock with the grooves. The teeth of the comb feed the label on to the surface of a vacuum belt 87 which is driven by a motor 88 over a vacuum roller or box 89. The register of the label to the container 80 is effected by the positioning of the container sensing device 82. The label and the container 25 are brought into intimate contact by means of a belt 90, driven by a motor 91, and the vacuum belt 87.

Finally, FIG. 7 shows an alternative method of applying the labels to non-circular containers 100. Two small-diameter, freely-rotating non-stick rollers 101 are rotated from near the centre of the adhesive-coated surface 102 of a label 103 towards and completely off the edge of a label block 104. The effect of rotating such a roller over the adhesive surface is to lift the top label away from the adjacent label at a point immediately behind the cylinder. The top label, which has thus been partially released from the adjacent block, can now be more easily separated from the block 104 when the block is brought into contact with the container 100 and subsequently pulled away from intimate contact. The block 104 is held securely by a vacuum cup 105 or mechanical clamp at the rear of the block. A mechanism 106 imparts an oscillating movement to the rollers such that they are rotated across the adhesive surface and off the edge of the block and are then returned to near the centre of the adhesive surface before the start of the next cycle, without contacting the adhesive surface until the rollers are back near to the start position.

The label 103 may subsequently be smoothed down firmly on to the container 100 by means of conventional sponge grips or any other suitable means.

I claim:

1. A method of producing blocks of self-adhesive products, which method comprises feeding continuously to a cutting device a continuous flexible web having on a first face thereof a multiplicity of repeated images overlaid by a release coating and further having on a second face thereof a pressure-sensitive adhesive coating, cutting from the web a succession of cut sheets each having at least two said images thereon, forming a stack of superimposed cut sheets, and subsequently cutting said stack to form at least two blocks of superimposed self-adhesive products, each said product having a single said image thereon.

2. A method according to claim 1, wherein the cutting of the sheets from the continuous flexible web and the forming of a stack of superimposed cut sheets are performed in successive separate operations.

3. A method according to claim 2, wherein the cutting of the sheets from the continuous flexible web comprises an incomplete cutting by means of a rotary die and the resulting incompletely cut sheets are subsequently separated from the stock and simultaneously stacked, by means of a shear cutting device.

4. A method according to claim 1, wherein the cutting of the sheets from the continuous flexible web and the forming of a stack of superimposed cut sheets are carried out in a single operation.

5. A method according to claim 4, wherein said single cutting and stacking operation is carried out by means of a die set consisting of a male die and a female die.

6. A method according to claim 5, wherein the surface surrounding the cutting area of the female die is modified to reduce any adhesion of said adhesively-coated web to that surface.

7. The method of claim 1, wherein said products are selected from the group consisting of labels, decorative wallpaper strips or tiles, interlocking cut shapes, tape and photographic products.

8. The method of claim 1, wherein the self-adhesive products are dispensed from a roll.

9. A method of producing blocks of self-adhesive products, which method comprises the steps of:

(a) applying a multiplicity of like images to a first face of a continuous flexible web;

(b) applying a layer of a release material to said first face over said images;

(c) applying a layer of a pressure-sensitive adhesive to a second face of said continuous flexible web;

(d) feeding said continuous flexible web continuously to a die set comprising a male die and a hollow female die;

(e) cutting said continuous flexible web in said die set to produce a succession of like cut sheets superimposed upon each other within said hollow female die, each of said cut sheets having a plurality of said images thereon; and (f) cutting said superimposed sheets in a direction generally perpendicular to the plane of the sheets, whereby to divide said stack into a plurality of blocks of superimposed self-adhesive products, each said product having only one said image thereon.

10. A method according to claim 9, wherein the pressure-sensitive adhesive is applied to only a part of the area of the second face of said web such that adhesive is absent in the region of cutting of sheets from said web.

11. A method according to claim 9, wherein the cutting of said superimposed sheets to form said plurality of blocks is carried out with a cutter selected from the group comprising guillotines and die cutters.

12. A method according to claim 11, wherein the resulting blocks of superimposed self-adhesive products are subsequently modified by displacing adjacent products from vertical superimposition.

13. A method according to claim 9, wherein an apertured panel is disposed between said continuous web and said male die, whereby to assist disengagement of said web and said die after cutting of said web.

14. The method of claim 9, wherein said products are selected from the group consisting of labels, decorative wallpaper strips or tiles, interlocking cut shapes, tape and photographic products.

15. The method of claim 9, wherein the self-adhesive products are dispensed from a roll.

16. A method of producing blocks of self-adhesive products, which method comprises the steps of:

(a) applying a multiplicity of like images to a first face of a continuous flexible web;

(b) applying a layer of a release material to said first face over said images;

(c) applying a layer of a pressure-sensitive adhesive to a second face of said continuous flexible web;

(d) cutting said web with a rotary cutter to incompletely separate from said web a succession of like partially cut sheets, each sheet having a plurality of said images thereon and being cut around a major proportion of its periphery;

(e) in a subsequent step, continuously separating said incompletely separated sheets from said cut web and forming a stack of superimposed separated sheets; and (f) cutting said stack of superimposed sheets in a direction generally perpendicular to the plane of said sheets, whereby to divide said stack into a plurality of blocks of superimposed self-adhesive products, each said product having a single said image thereon.

17. The method of claim 16, wherein the self-adhesive products are dispensed from a roll.

18. The method of claim 16, wherein said products are selected from the group consisting of labels, decorative wallpaper strips or tiles, interlocking cut shapes, tape and photographic products.

* * * * *